3,476,709
SULFOLANE (TETRAHYDROTHIOPHENE-1,1-DI-
OXIDE) AS SOLVENT FOR POLYMERIZATION
OF DIAMINES AND UREAS
Faber B. Jones, Bartlesville, Okla., assignor to Phillips
Petroleum Company, a corporation of Delaware
No Drawing. Filed Aug. 30, 1966, Ser. No. 575,976
Int. Cl. C08g 22/02
U.S. Cl. 260—77.5
4 Claims

ABSTRACT OF THE DISCLOSURE

Sulfolanes are used as solvents in the solution polymerization of diamines and ureas resulting in improved reaction rates and clean, easily purified products.

---

This invention relates to a process of polymerization, and to the products resulting therefrom.

In another aspect, the invention relates to solution polymerization of a diamine and a urea in a solvent comprising acyclic sulfone at a relatively high operating temperature.

In another aspect, the invention relates to the production of new polyureas having the formula

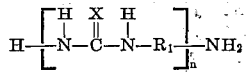

wherein X is selected from oxygen and sulfur, and $R_1$ is selected from unsubstituted and substituted arylene radicals.

In yet another aspect, the invention relates to the use of polyalkyleneureas as adhesives.

The condensation products of diamines and urea have been prepared in the past by fusing dry reagents. Under these conditions, severe discoloration and decomposition occur, limiting the use of the polymers produced. It has been suggested that aromatic solvents be used at lower temperatures but these have been difficult to remove from the products.

Recently, the use of cyclic amides such as N-methyl-2-pyrrolidone has been suggested as solvents for the condensation of diamines and urea. Though the products from this procedure are considerably improved, and the separation from the solvent is somewhat simplified, the products are not wholly satisfactory. It is an object of this invention to provide a new, stable solvent for the solution condensation of diamines and ureas, resulting in a cleaner product uncontaminated by solvent or decomposition products. It is also an object of the invention to provide a new polymerization solvent which can be separated from the products of the condensation by filtration and water washing. Another object of the invention is to provide a new solvent for the condensation of a diamine and a urea that permits higher operating temperatures at atmospheric pressure and a concomitant increased rate of polymerization. A further object is to provide a new solvent for the solution polymerization of a diamine and a urea which readily dissolves the reactants, and is particularly useful in the polymerization of a urea with large molecules such as the dodecamethylenediamine molecule. Yet another object is to provide polyureas which are particularly useful as adhesives and coatings, and which can be fabricated into fibers having good mechanical characteristics.

Other aspects, objects and the several advantages of the invention will be apparent to one skilled in the art from a reading of the disclosure and appended claims.

In accordance with the invention, the formation of a polyurea is effected by contacting a diamine with a urea dissolved in a solvent comprising a cyclic sulfone, under conditions sufficient to promote formation of said polyurea; generally, it is preferred to heat the resulting mixture for a time sufficient to form the polyurea. The process of this invention is particularly useful in forming a composition of matter comprising a polyurea having the formula

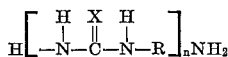

wherein X is selected from oxygen and sulfur, R is selected from divalent hydrocarbon radicals having 2 to about 30 carbon atoms or more, and n is an integer of from about 30 to about 300 or more. Examples of said divalent hydrocarbon radicals include alkylene, cycloalkylene, and arylene, and combinations thereof such as aralkylene, alkarylene and the like, including alkylene in which a methylene group is replaced by arylene, cycloalkylene, or the like.

Specific examples of some polyureas which can be produced by this process include:

polydimethyleneurea
polytetramethylenethiourea
polyheptamethyleneurea
polyoctamethyleneurea
polydecamethyleneurea
polyundecamethyleneurea
polydodecamethyleneurea
polyeicosamethylenethiourea
polytriacontamethyleneurea
poly-2-methylhexamethylenethiourea
poly-1,4-cyclohexyleneurea
poly-m-phenyleneurea
poly-p-phenyleneurea
poly-3-phenyloctamethyleneurea
polytetramethyl-p-phenylenethiourea
poly-m-xylyleneurea
poly-m-xylylenethiourea
poly-1,3-cyclopentylenedimethyleneurea and the like.

Diamines which can be used in preparing polyureas by the process of this invention can be represented by the formula

wherein R is defined as shown above. Specific examples of some applicable diamines include:

ethylenediamine
tetramethylenediamine
hexamethylenediamine
heptamethylenediamine
octamethylenediamine
decamethylenediamine
undecamethylenediamine
dodecamethylenediamine
eicosamethylenediamine
triacontamethylenediamine
2-methylhexamethylenediamine
1,4-cyclohexylenediamine
m-phenylenediamine
p-phenylenediamine
3-phenyloctamethylenediamine
2,3,5,6-tetramethyl-p-phenylenediamine
m-xylylenediamine
1,3-bis(aminomethyl)cyclopentane and the like.

Ureas suitable for the practice of this invention have the general formula

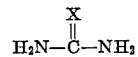

wherein X is selected from sulfur and oxygen. That is, both urea and thiourea can be used.

An essential element in the practice of this invention is the use of a cyclic sulfone as a solvent in a solution polymerization process. Suitable cyclic sulfones have the generic formula

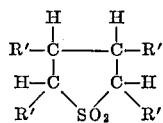

wherein R' is selected from hydrogen and lower alkyl radicals such as methyl or ethyl, the total number of carbon atoms in all of said R"s preferably not exceeding 4. Representative examples of the cyclic sulfones include:

sulfolane in which all R's are hydrogen, and
3-methylsulfolane
2-methylsulfolane
2-ethylsulfolane
3-ethylsulfolane
2,5-dimethylsulfolane
3,4-dimethylsulfolane
3,4-diethylsulfolane
2-ethyl-3,4-dimethylsulfolane
2,3,4,5-tetramethylsulfolane and the like, The process of the invention, according to a presently preferred embodiment, is practiced by charging a diamine and a urea to a reactor under an inert atmosphere, and heating the resulting mixture for a time sufficient to form the polyurea. A sufficient amount of the cyclic sulfone solvent must be added to at least dissolve all the reactants. The examples below illustrate that higher reaction temperatures at atmospheric pressure are possible by using a cyclic sulfone as a solvent, and that a cleaner, more easily separated product of improved color results from the practice of this process.

The process of this invention is particularly useful in producing a new composition of matter comprising a polyurea having the structure

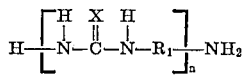

wherein X is selected from oxygen and sulfur, $R_1$ is selected from unsubstituted and substituted arylene radicals having 6 to about 30 carbon atoms or more, and $n$ is an integer of about 30 to about 300 or more.

Examples of said unsubstituted and substituted arylene radicals include arylene radicals with or without alkyl substitutents, and alkylene radicals in which a methylene group is replaced by an arylene group. Specific examples of polyureas of this type include:

poly-m-phenyleneurea
poly-p-phenyleneurea
polytetramethyl-p-phenylenethiourea
poly-m-xylyleneurea
poly-m-xylylenethiourea
poly-o-phenylenebis(hexamethylene)thiourea
poly-p-phenylenebis(dodecamethylene)urea and the like.

It will be apparent to one skilled in the art that the higher operating temperature at atmospheric pressure made possible by using a cyclic sulfone as a solvent increases the rate of polymerization and reduces the overall process time, and the examples demonstrate that no decomposition of the polymer product occurs. Cyclic sulfones are very stable solvents which are not readily oxidized or reduced, and they will not react with a diamine, urea, or thiourea. Temperatures of up to 280° C. and higher can be used to promote polymerization in a cyclic sulfone solvent at atmospheric pressure, whereas temperatures this high cannot be used when certain common cyclic amides are employed at atmospheric pressure.

The polyalkyleneureas are especially useful as adhesives. The polyureas in which $R_1$ as defined above is an unsubstituted or substituted arylene radial are useful in the production of fibers and films and as lubricating grease additives. They can also be modified to give useful adhesives.

EXAMPLE I

| | G. |
|---|---|
| m-Xylylenediamine (0.413 mole) | 56.17 |
| Urea (0.40 mole) | 24.00 |
| Sulfolane (distilled) | 400 |

A stirred 1000 ml. resin kettle fitted with a Dean-Stark tube and condenser was used. All reagents were charged under nitrogen and heating was started with the temperature gradually increasing to 270° C. The reaction was continued for six hours. Upon cooling a clear, translucent precipitate formed. The mixture was allowed to stand overnight and heated again to 230° C. A clear, colorless solution was formed. Upon slow cooling the clear, translucent precipitate reformed, was filtered, washed with water and dried.

The washed polymer, poly-m-xylyleneurea, was a light yellow, highly brittle material which decomposed at about 280° C.

EXAMPLE II

| | G. |
|---|---|
| m-Xylylenediamine (0.5 mole) | 68.0 |
| Urea (0.5 mole) | 30.0 |
| N-methyl-2-pyrrolidone | 400 |

The run was carried out substantially as in Example I substituting N-methyl-2-pyrrolidone for sulfolane. The reaction temperature did not exceed 205° C., the approximate boiling point of N-methyl-2-pyrrolidone at atmospheric pressure, and the reaction was continued for 2½ hours. The crude material precipitating upon cooling was a yellowish waxy cake. It was washed twice with 150 ml. portions of isopropanol in a Waring Blendor, then washed twice with water. The supernatant liquid after each washing was yellowish and the final product a butter yellow material.

The polyurea of Example II was substantially darker than the product of Example I.

EXAMPLE III

| | G. |
|---|---|
| Dodecamethylenediamine (0.310 mole) | 62.0 |
| Urea (0.30 mole) | 18.00 |
| Sulfolane (distilled) | 400 |

The run was conducted as in Example I with the temperature rising to a maximum of 230° C. The reaction was continued for 8 hours. There was no discolorization of any kind even after prolonged heating at 230° C. The solution was cooled under nitrogen and a highly translucent slurry formed at about 80° C. The supernatant liquid was colorless. 500 ml. water was added and the mixture was stirred at 60° C. for an hour and filtered. After repeated washing with hot (60° C.) water, a white solid, polydodecamethyleneurea, having an inherent viscosity of 0.7 dl./g. was recovered. A pressed disc of this polymer gave a nearly white sheet.

The room temperature lap shear strength (ASTM D1002–53T) of aluminum (2024T alloy) coupons bonded together by a 3–4 mil layer of the polydodecamethyleneurea as 1703 p.s.i. The bonding was carried out at 250° C. for 15 minutes, the bonded coupons then being cooled under pressure.

Example IV

| | G. |
|---|---|
| Dodecamethylenediamine (0.3 mole) | 60.0 |
| Urea (0.30 mole) | 18 |
| N-methyl-2-pyrrolidone | 400 |

This run was conducted in N-methyl-2-pyrrolidone as in Example III. The recovered product as brownish and showed discoloration as in Example II. Pressed disc clearly showed the difference between the two methods of preparation, and a lower temperature was required with N-methyl-2-pyrrolidone as solvent because of its lower boiling point, thus prolonging reaction time.

EXAMPLE V

| | G. |
|---|---|
| m-Xylenediamine (0.413 mole) | 56.17 |
| Thiourea (0.40 mole) | 30.4 |
| Sulfolane | 400 |

The reaction was conducted as outlined in Example I. The recovered product, poly-m-xylylenethiourea, had a melting point of about 120–130° C.

EXAMPLE VI

| | | |
|---|---|---|
| p-Phenylendiamine (0.2 mole) | g | 21.62 |
| Urea (0.2 mole) | g | 12.12 |
| Sulfolane | ml | 450 |

A mixture of the above substances was heated at 120° C. for 3 hours and then at 230–250° C. for 5 hours. Polymer precipitated from solution during the course of the reaction. The polymer was filtered, washed with hot water and with hot methanol, and dried. The resulting poly-p-phenyleneurea weighed 25 g. and had an inherent viscosity of 0.09 dl./g.

Reasonable modification and variation are possible within the spirit and scope of the invention, the essence of which is a process of preparing a polyurea comprising contacting a diamine with a urea dissolved in a solvent comprising a cyclic sulfone under conditions sufficient to form the polyurea. A new class of polyureas having the formula

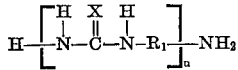

wherein X is sulfur or oxygen, $R_1$ is an unsubstituted or substituted arylene radical, and $n$ is an integer of about 30 to about 300 or more, are easily prepared by practicing the process of this invention.

I claim:

1. A process for producing a polyurea polymer comprising reacting a diamine with a urea dissolved in a solvent consisting essentially of a cyclic sulfone having the general formula

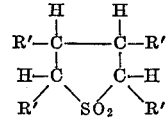

wherein each R' is selected from the group consisting of hydrogen and lower alkyl radicals at an elevated temperature up to 280° C. and for a period of time sufficient to form said polyurea polymer.

2. A process as defined in claim 1 wherein said diamine has the formula

wherein R is selected from divalent hydrocarbon radicals having from 2 to 30 carbon atoms such as alkylene, cycloalkylene, and arylene, and combinations thereof.

3. A process as defined in claim 1 wherein said diamine is an arylene diamine and said solvent is sulfolane.

4. A process as defined in claim 1 wherein said urea is selected from the group consisting of urea and thiourea.

References Cited

UNITED STATES PATENTS

| | | | |
|---|---|---|---|
| 3,185,656 | 5/1965 | Gabler et al. | 260—30.2 |
| 3,196,163 | 7/1965 | Argyle et al. | 260—332.1 |
| 3,259,646 | 7/1966 | Harris et al. | 260—465 |
| 2,816,879 | 12/1957 | Wittbecker et al. | 260—77.5 |

FOREIGN PATENTS

| | | |
|---|---|---|
| 798,543 | 7/1958 | Great Britain. |
| 946,087 | 1/1964 | Great Britain. |

OTHER REFERENCES

Arnett et al., Journal American Chem. Soc., vol. 86 (1964), pp. 409–412.

Parker, Quarterly Review, vol. 16 (1962), pp. 163–187.

DONALD E. CZAJA, Primary Examiner

H. S. COCKERAM, Assistant Examiner

U.S. Cl. X.R.

260—30.8, 332.1